United States Patent Office 2,780,528
Patented Feb. 5, 1957

2,780,528
PROCESS FOR RECOVERING IODINE FROM IODINE-CONTAINING AQUEOUS GLYCOL SOLUTIONS

Kåre Ragnvald Fossan and Gustav Allan Wetterholm, Gyttorp, Sweden, assignors to Nitroglycerin Aktiebolaget, Gyttorp, Sweden, a corporation of Sweden No Drawing. Application September 8, 1953, Serial No. 379,064

Claims priority, application Sweden September 15, 1952

4 Claims. (Cl. 23—216)

The present invention concerns the production of glycol by direct oxidation of ethylene with oxygen in aqueous phase, when using iodine as oxygen-transmitting agent, and more particularly, the invention refers to a process for the recovery of iodine from the reaction mixture obtained in said oxidation process. This reaction mixture contains, besides glycols, free iodine, hydrogen iodide, iodohydrin, ethylene iodide and other oxidation products of ethylene, such as aldehydes and acids. It is of course a necessary condition, if the process is to be technically practicable at all, that the iodine should be recovered in a simple way and practically quantitatively.

The present invention supplies a solution of this problem. The invention is based upon the experimental investigations which have shown that it is possible to precipitate iodine from such reaction mixtures containing glycol and other substances by treating them with oxidizing agents under certain conditions, without this having any injurious effect upon the other constituents of the mixture.

On the basis of these results the process according to the invention consists therein that the said reaction solution is treated with such oxidizing agents as have a redox potential higher than that corresponding to the reaction $2I^- = I_2 + 2E$, for which reaction $E = 0.54$.

Examples of such oxidation agents are chlorine, nitrogen oxides, potassium permanganate, hydrogen peroxide, ferric chloride, hypochlorous acid, chromium trioxide etc. Substances from which the oxidation agents are liberated under the influence of acid are also usable, e. g. sodium nitrite alone or with simultaneous addition of oxygen. The addition of the oxidizing agent to the reaction mixture may also take place with simultaneous mechanical stirring of the mixture.

By the treatment according to the invention in the first place iodine is precipitated from the hydrogen iodide, and at the same time the iodine that is bound in complex compounds is liberated. Iodine that is present in the solution in the form of iodohydrin or diiodide is not precipitated directly, but by hydrolysis these compounds may easily be converted to hydrogen iodide, from which the iodine is then precipitated. In this way it is possible to recover quantitatively the whole amount of iodine employed in the oxidation of ethylene.

The manner of carrying out the process according to the invention is described in greater detail below in the following non-limitative examples.

Example 1

The reaction mixture to be treated had the following composition in respect of iodine compounds:

|  | Percent |
|---|---|
| Free iodine | 0.69 |
| Hydrogen iodide, reckoned as $I_2$ | 3.13 |
| Iodohydrin, reckoned as $I_2$ | 0.31 | or a total iodine-content of 41.7 g./1000 g. solution.

In this reaction a mixture of nitrose and oxygen was introduced at room temperature, with simultaneous mechanical stirring. A wash bottle with nitrose was connected up with the oxygen supply conduit as a shunt, and by regulating that part of the oxygen that passed through the nitrose vessel it was possible to vary the ratio of the gases. In this example the amount of nitrose in the gas introduced was 15%. Iodine was precipitated in the crystalline form from the hydrogen iodide, and at the same time also the iodine occurring in the solution bound in complex form was precipitated. The introduction of gas was continued to the point at which all the hydrogen iodide had been oxidized, which is easily established, as reddish brown clouds of precipitated iodine are no longer formed at the end of the tube through which the gas is introduced, when the precipitation is complete, and the solution is then completely clear. When introducing the gas care was taken to avoid excess of nitrose:oxygen so that the solution should not become unnecessarily acid.

The precipitated iodine was easily separated by filtering with a Buchner funnel. Only iodine in the form of ethylene iodohydrin was then left in the filtrate. In order to recover this, the solution was made alkaline and heated to 70 to 80° C. for 2 to 3 hours, whereby the iodine compound was completely hydrolyzed. By cooling and acidifying free hydrogen iodide was obtained, which was precipitated in the crystalline form by renewed treatment with a mixture of nitrogen oxides and oxygen and filtered off. The amount of iodine recovered in this way was 41.1 g./1000 g. solution, i. e. 98.6% of the amount of iodine present.

Example 2

In this case the reaction solution had the following composition in respect of iodine compounds:

|  | Percent |
|---|---|
| Free iodine | 0.05 |
| Hydrogen iodide, reckoned as $I_2$ | 1.91 |
| Iodohydrin, reckoned as $I_2$ | 1.85 |

Consequently, the total amount of iodine corresponded to 38.2 g./1000 g. solution.

Through this reaction mixture a stream of chlorine gas was conducted at room temperature and with mechanical stirring. In the same way as in the foregoing example iodine was precipitated from the hydrogen iodide and from dissolved compounds containing iodine bound in complex form, and filtered off. The iodohydrin was then hydrolyzed and the treatment further carried out in the same way as in Example 1, but using chlorine for the precipitation of the iodine in the second step and avoiding excess of chlorine. The amount of iodine recovered in this way was 38.8 g./1000 g. solution, i. e. 101.5% of the amount of iodine originally employed, which within the limits of error for the analytic results indicates that a quantitative recovery was attained.

Example 3

The reaction solution to be treated had the following composition in respect of iodine compounds:

|  | Percent |
|---|---|
| Free iodine | 0.07 |
| Hydrogen iodide, reckoned as $I_2$ | 3.45 |
| Iodohydrin, reckoned as $I_2$ | 0.10 |

Consequently, the total amount of iodine compounds in the solution was 3.62%.

To 300 g. of this solution was added $H_2SO_4$ (50%) in an amount equivalent to the amount of hydrogen iodide in the solution. Then $NaNO_2$ was added successively, while continuously stirring. The addition took place during 15 minutes and a total amount of 2 g. sodium nitrite was added, whereby the iodine was precipitated in the crystalline form. After filtering off the iodine, NaOH (10%) was added to the solution in an amount sufficient to create alkaline reaction and the solution was heated on water bath for 2 hours. During this time the reaction of the solution was controlled and more sodium hydroxide was added, when required, to maintain the alkaline reaction. By this treatment the iodohydrin was hydrolyzed. After acidifying with diluted $H_2SO_4$, the iodine liberated by the hydrolysis was precipitated by adding 0.1 g. $NaNO_2$. The amount of iodine recovered was 10.7 g. or 98.7% of the total amount of iodine compounds originally present in the solution.

*Example 4*

The composition of the reaction solution to be treated in respect of iodine compounds was as follows:

| | Percent |
|---|---|
| Free iodine | 0.68 |
| Hydrogen iodide, reckoned as $I_2$ | 2.45 |
| Iodohydrin, reckoned as $I_2$ | 0.70 | or a total iodine-content of 38.3 g./1000 g. solution.

To 200 g. of this solution was added 50 g. hydrogen peroxide (3%). The mixture was left to stand for 1½ hours at room temperature, whereby the iodine was precipitated in the crystalline form. The iodohydrin was still unaltered in the solution and the iodine from this compound was recovered in the following manner: after filtering off the iodine already precipitated, NaOH (10%) was added to the solution in an amount sufficient to make the solution alkaline and the solution was then heated on water bath for 2 hours. The reaction of the solution was controlled from time to time and more sodium hydroxide was added when required for maintaining the alkaline reaction. The solution was then acidified with diluted sulphuric acid, whereupon 15 ml. hydrogen peroxide (3%) was added. The solution was then left to stand for 1 hour, whereby the iodine previously contained in the iodohydrin was precipitated and then filtered off. The recovered amount of iodine was 7.55 g. which corresponds to 98.5% of the amount of iodine originally present in the solution.

*Example 5*

In this case a reaction solution of the same composition as in Example 3 was treated. Consequently, it contained 0.07% free iodine, 3.45% hydrogen iodide, reckoned as $I_2$, and 0.10% iodohydrin, reckoned as $I_2$, e. g. a total iodine-content, reckoned as $I_2$, of 3.62%.

To 300 g. of this solution sodium hypochlorite solution of a concentration corresponding to 74.3 g. active chlorine per litre was added while shaking. After addition of 20 ml. hypochlorite solution, the total amount of iodine present as hydrogen iodide was precipitated in the crystalline form. The solution was then made alkaline by adding sodium hydroxide (10%) and thereupon heated on water bath 2 hours, whereby the iodohydrin was hydrolyzed. After cooling, diluted sulphuric acid was added in an amount equivalent to the amount of sodium hydroxide previously added and the remaining iodine was precipitated by adding 1 ml. sodium hypochlorite solution. The recovery of iodine was quantitative.

What we claim is:

1. In the recovery of iodine from aqueous glycol solutions containing dissolved free iodine, hydrogen iodide and hydrolyzable organic iodine compounds; the process which comprises treating such a glycol solution with a sufficient amount of an oxidizing agent, selected from the class consisting of chlorine, nitrogen oxides, potassium permanganate, hydrogen peroxide, ferric chloride, hypochlorous acid, chromium trioxide and substances capable of generating these oxidizing agents in the solution, to oxidize the iodides present without affecting the glycol and the hydrolyzable iodine compounds, thereby precipitating free iodine, hydrolyzing the said hydrolyzable iodine compounds by making the solution alkaline and heating to water bath temperatures, acidifying the solution and again treating the solution with a sufficient quantity of said oxidizing agent to precipitate iodine from the products resulting from the hydrolysis, and recovering the precipitated iodine.

2. In the recovery of iodine from aqueous glycol solutions containing dissolved free iodine, hydrogen iodide and hydrolyzable organic iodine compounds; the process which comprises treating such a glycol solution with an oxidizing agent, selected from the class consisting of chlorine, nitrogen oxides, potassium permanganate, hydrogen peroxide, ferric chloride, hypochlorous acid, chromium trioxide and substances capable of generating these oxidizing agents in the solution, the concentration of said oxidizing agent being sufficient to oxidize the iodides present and thereby to precipitate free iodine without affecting the glycol and the hydrolyzable organic iodine compounds, filtering off the precipitated iodine, making the remaining solution alkaline and heating it to hydrolyze the hydrolyzable iodine compounds, acidifying the solution and again treating it with said oxidizing agent to precipitate the remaining iodine from the solution, and filtering off the precipitated iodine.

3. In the recovery of iodine from aqueous glycol solutions containing dissolved free iodine, hydrogen iodide and hydrolyzable organic iodine compounds; the process which comprises treating such a glycol solution with an oxidizing agent having a redox potential higher than that corresponding to the reaction $2I^-=I_2+2E$, the constant E for said reaction being 0.54, and being capable of oxidizing the iodides present without affecting the glycol and hydrolyzable iodine compounds, separating the iodine thus precipitated, making the remaining solution alkaline, heating to water bath temperatures to hydrolyze the remaining iodine compounds, again treating with said oxidizing agent to precipitate iodine from the products of hydrolysis and again separating the precipitated iodine.

4. In the recovery of iodine from aqueous glycol solutions containing dissolved free iodine, hydrogen iodide and hydrolyzable organic iodine compounds; the process which comprises treating such a glycol solution with a mixture of nitrose and oxygen, separating the iodine thus precipitated, making the remaining solution alkaline, heating to water bath temperatures to hydrolyze the remaining iodine compounds, thereafter treating with a mixture of nitrogen oxides and oxygen to precipitate iodine from the production of hydrolysis and again separating the precipitated iodine.

References Cited in the file of this patent

UNITED STATES PATENTS

| 1,708,287 | Turrentine | Apr. 9, 1929 |
| 1,936,553 | Jones | Nov. 21, 1933 |
| 2,385,483 | Wolff | Sept. 25, 1945 |

FOREIGN PATENTS

| 55,232 | Norway | May 27, 1935 |

OTHER REFERENCES

Middel: Chemical Abstracts, vol. 37, 1943, column 59.
Handbook of Chemistry and Physics, Chemical Rubber Publishing Co., 30th edition, 1947, pp. 1418 to 1420.